United States Patent

McKissick et al.

[15] 3,636,687
[45] Jan. 25, 1972

[54] ASPARAGUS-HARVESTING MACHINE AND METHOD

[72] Inventors: Robert T. McKissick, Tracy; Vincent W. Sebastian, Pollock Pines; Ray D. Davis; Arthur R. Sasser, both of Tracy, all of Calif.

[73] Assignee: AG-Bilt, Tracy, Calif.

[22] Filed: Oct. 9, 1969

[21] Appl. No.: 864,991

[52] U.S. Cl. ................................. 56/327 A, 56/DIG. 15
[51] Int. Cl. ................................................ A01d 45/00
[58] Field of Search .................... 56/327, 327 A, DIG. 15

[56] References Cited

UNITED STATES PATENTS

| 2,581,119 | 1/1952 | Matteoli | 56/327 A |
|---|---|---|---|
| 2,690,043 | 9/1954 | Marihart | 56/327 A |
| 2,709,330 | 5/1955 | Lafferty et al. | 56/327 A |
| 2,767,544 | 10/1956 | Turkington | 56/DIG. 15 |
| 3,066,469 | 12/1962 | Chatagnier | 56/DIG. 15 |
| 3,176,456 | 4/1965 | Franzen | 56/327 A |
| 3,328,943 | 7/1967 | Marmorine | 56/327 A |
| 3,380,237 | 4/1968 | Garrett | 56/DIG. 15 |
| 3,412,540 | 11/1968 | Lawson | 56/327 A |
| 3,412,541 | 11/1968 | Fuchs | 56/327 A |
| 3,447,292 | 6/1969 | Rehmke | 56/327 A |

OTHER PUBLICATIONS

" Green Asparagus Harvesters To Be Tried This Year," California Farm Bureau Monthly, March 1967 p. 10

*Primary Examiner*—Louis G. Mancene
*Assistant Examiner*—J. A. Oliff
*Attorney*—Townsend and Townsend

[57] ABSTRACT

A machine for harvesting asparagus and other similar crops wherein the machine has a plurality of knives which move through the ground and are caused to shift laterally to sever the spears of asparagus when the height of the spears are sensed and are found to be above a predetermined minimum value. The sensing means includes an electrical switch provided with a swingable actuating arm transverse to the path of travel of the machine. A roller assembly is provided to grasp the spears after they have been severed from the ground and to move the spears onto a conveyor system for movement to a collection station on the machine.

10 Claims, 11 Drawing Figures

PATENTED JAN 25 1972

INVENTORS
ROBERT T. MCKISSICK
VINCENT W. SEBASTIAN
RAY D. DAVIS
ARTHUR R. SASSER

BY Townsend and Townsend
ATTORNEYS

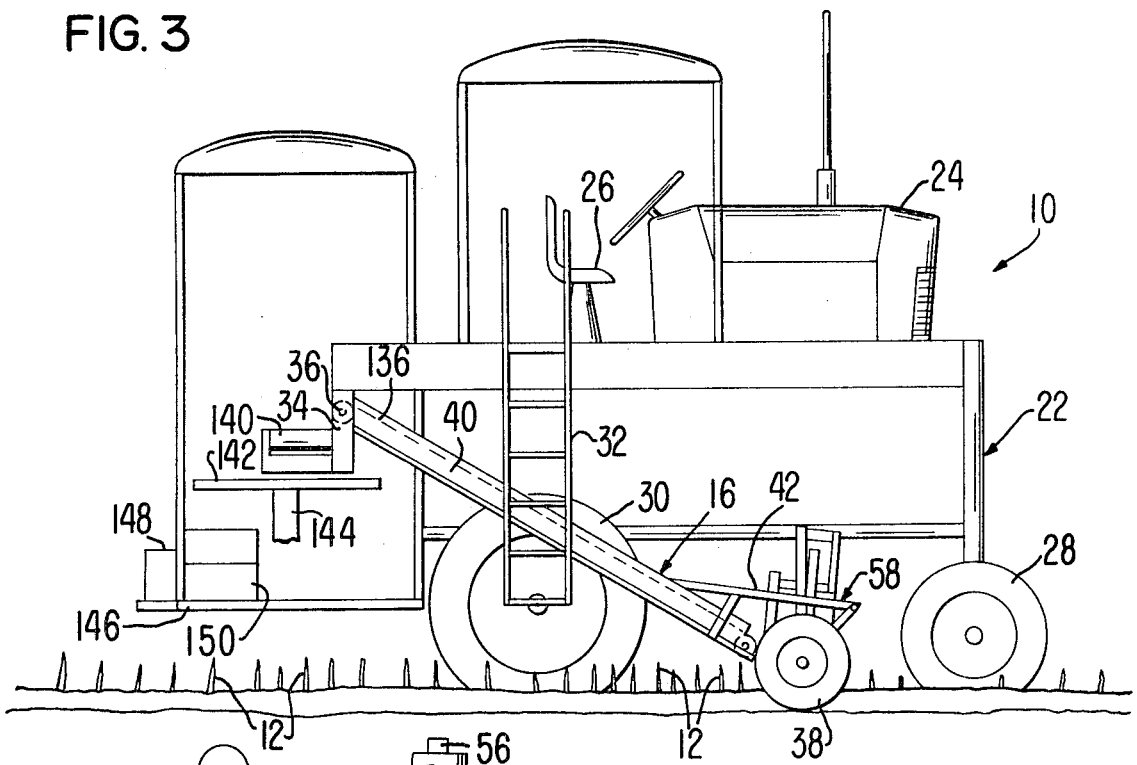
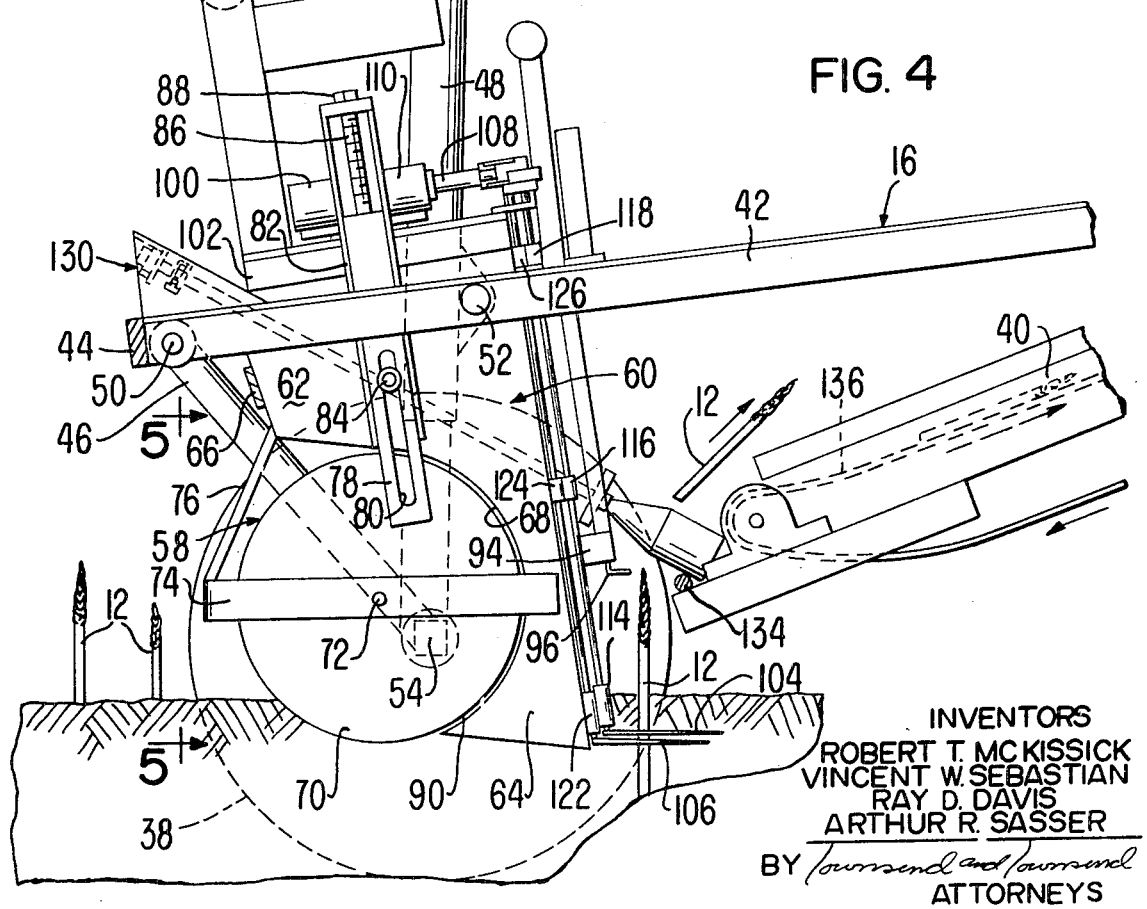

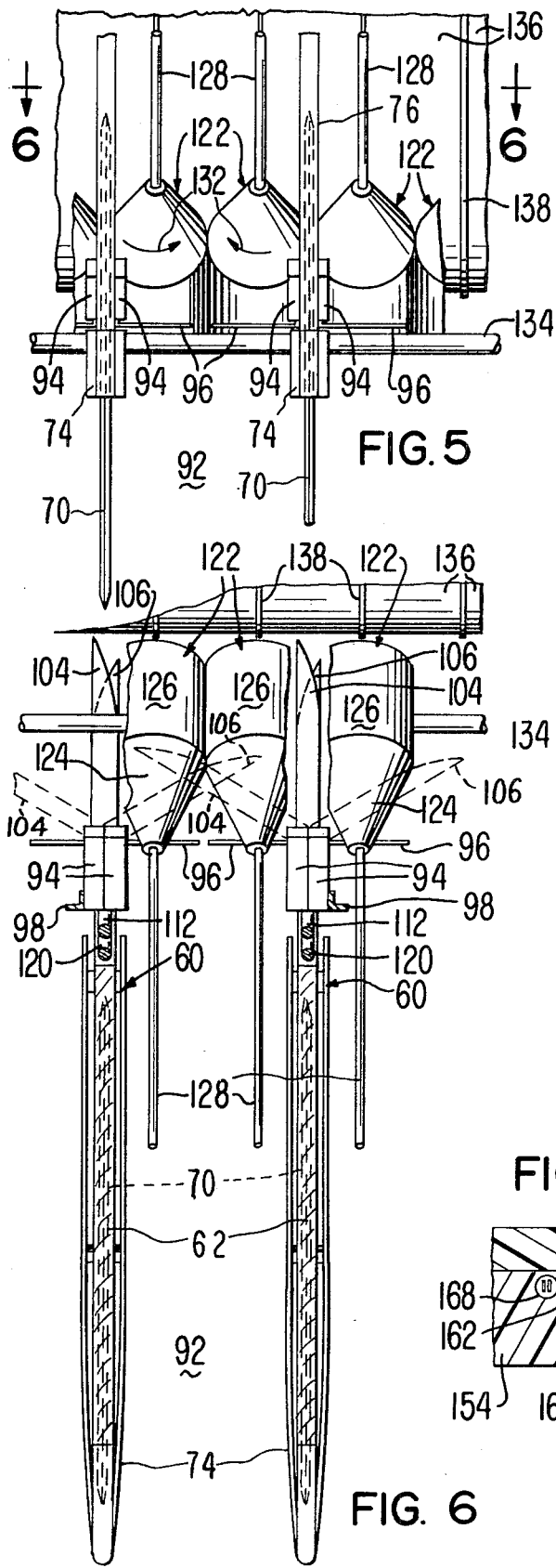
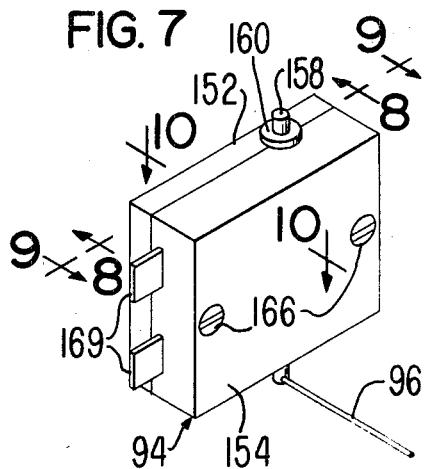
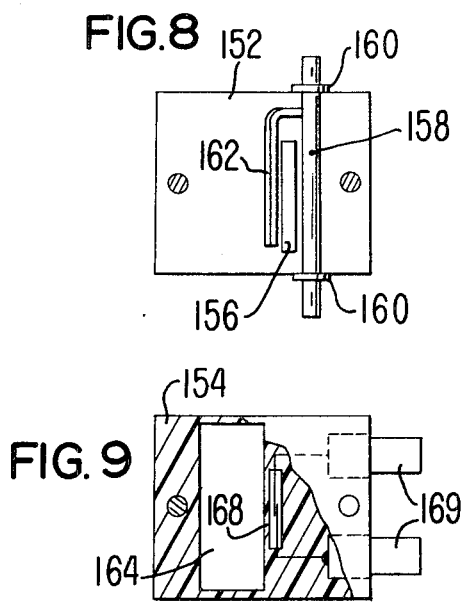

ASPARAGUS-HARVESTING MACHINE AND METHOD

This invention relates to improvements in the harvesting of crops and, more particularly, to a machine for harvesting asparagus.

In harvesting a field of asparagus, it is important to cut the asparagus spears only after they have grown to a specific height and before they reach a condition known as turning to fern. It is desirable to cut the spears several inches below ground since this increases the yield of a particular field.

Mechanical means of harvesting asparagus have been developed in the past but, generally, such means have been found unsatisfactory because, due to their complicated mechanisms, they simply do not efficiently cut the growing spears and also because damage to the spears oftentimes occurs during normal harvesting operations. Such damage reduces the yield from a field. Moreover, mechanical harvesting means used in the past have, for the most part, been constructed to cut the spears above the ground so that usable portions of the spears are effectively discarded to thereby further decrease the yield of the crop for a particular area.

The present invention provides a highly efficient asparagus-harvesting machine which can move over a number of adjacent rows of growing asparagus and not only sense the asparagus spears which have grown to a predetermined height above ground, but which also can cut the spears at a predetermined location below ground and elevate the cut spears onto the machine so that the spears can be directed to a collection station for packing into suitable receptacles. The effectiveness of the machine is due to the cooperation of the various elements thereof which includes a sensing and cutting unit for movement over each row of growing asparagus spears, the unit being comprised of means defining a number of channels which receive the growing asparagus as the machine moves over the ground. Once the spears are in the channels, their heights are sensed by a sensor means including an improved electrical switch having a shiftable actuator arm at a height above the row equal to the minimum height of the spears to be harvested. The switches are coupled to actuator means for shifting respective pairs of knives into the channels and thereby across the path of relative movement of the spears so as to sever the spears immediately prior to the pickup of the same for movement to the collection station on the machine. The knives travel below ground and thereby cut the spears at a desired location below the upper surface of the row so that each spear will be of maximum length to assure optimum yield for a particular field of growing asparagus.

The means for grasping the spears and directing them onto the machine comprises a pair of contrarotating rollers for each channel of the sensing and cutting unit, respectively. The rollers have conical forward surfaces which converge toward each other so as to guide the spears into the region between cylindrical portions of the rollers. By means of the cylindrical portions, the spears are elevated and moved rearwardly and, in so doing, are caused to be tilted or inclined rearwardly of the direction of movement of the machine by a transversely disposed bar engageable with the lower ends of the spears. The rollers project the spears onto an upwardly and rearwardly moving conveyor adjacent to the rollers whereby the spears can move to the collection station on the machine. Moreover, the rollers cooperate with the conveyor to orient the spears with their lower ends being in trailing relationship to their upper ends. This facilitates the job of packing the spears in a receptacle for shipment to market since the spears are already oriented before the operator at the collection station bundles a group of the spears for placement into the receptacle.

An important aspect of the invention is the provision of an improved electrical switch for use in sensing the heights of the spears which enter the channels before being cut. The switch has no moving parts except for the actuating arm and a shaft connected to the arm. The shaft carries a magnetic shield which moves out of the region between a switch sensitive to a magnetic field and a source of magnetic field. This movement is effected when the actuating arm of the switch senses a spear so that the magnetic field will actuate the switch to, in turn, energize a power device to cause the knives to move into cutting relationship to a spear advancing relative to and through the corresponding channel of the sensing and cutting unit. The attractive force between the shield and the magnetic field source automatically returns the shield to its initial position after the actuating arm moves out of engagement with the spear. Thus, the power device is deenergized and the knives are returned to their equilibrium positions to await the next actuation upon movement of the actuating arm by another spear.

The primary object of this invention is to provide improved apparatus and method for harvesting a crop wherein a growing crop, such as asparagus spears, are automatically sensed in height, cut, elevated from the ground, and moved to a collection station without damage to the spears and while covering a row of the crops sufficiently to assure maximum yield from the row.

Another object of this invention is to provide a machine for harvesting asparagus wherein the machine is provided with an improved sensing and cutting unit which channels the growing spears of asparagus along paths which permit the spears to be sensed in height before they are cut at locations along their lengths below ground so that the spears will be properly presented in a manner to be effectively cut without damage to the spears and while assuring maximum crop yield.

A further object of this invention is to provide a harvesting machine of the type described which has means for elevating the cut spears from the ground and for moving the spears upwardly and rearwardly while the spears remain oriented in a predetermined manner to facilitate the gathering of the spears in bunches at a collection station for deposit into a suitable container.

A further object of this invention is to provide an improved electrical sensing switch means having a switch portion responsive to the presence of a magnetic field and provided with a shaft having a shield normally disposed between the switch portion and a source of magnetic field, whereby rotation of the shaft will move the shield out of the region between the switch portion and field source to cause actuation of the switch portion as a function of the rotation of the shaft.

Other objects of this invention will become apparent as the following specification progresses, references being had to the accompanying drawings for an illustration of an embodiment of the machine.

In the drawings:

FIG. 3 is a side elevational view of the machine in schematic form;

FIG. 4 is an enlarged, fragmentary cross-sectional view of a portion of the machine showing a sensing and cutting section thereof;

FIG. 5 is an enlarged, fragmentary elevational view of the machine looking along line 5—5 of FIG. 4;

FIG. 6 is a cross-sectional view taken along line 6—6 of FIG. 5;

FIG. 7 is an enlarged, perspective view of an electrical sensing switch forming a part of a sensing and cutting section of the machine;

FIG. 8 is a cross-sectional view of the switch taken along line 8—8 of FIG. 7;

FIG. 9 is a cross-sectional view of the switch taken along line 9—9 of FIG. 7;

FIG 10 is a cross section taken along line 10—10 of FIG. 7 and illustrating a first operative position of the switch; and FIG. 11 is a view similar to FIG. 10 but showing a second operative position of the switch.

Figure 1:
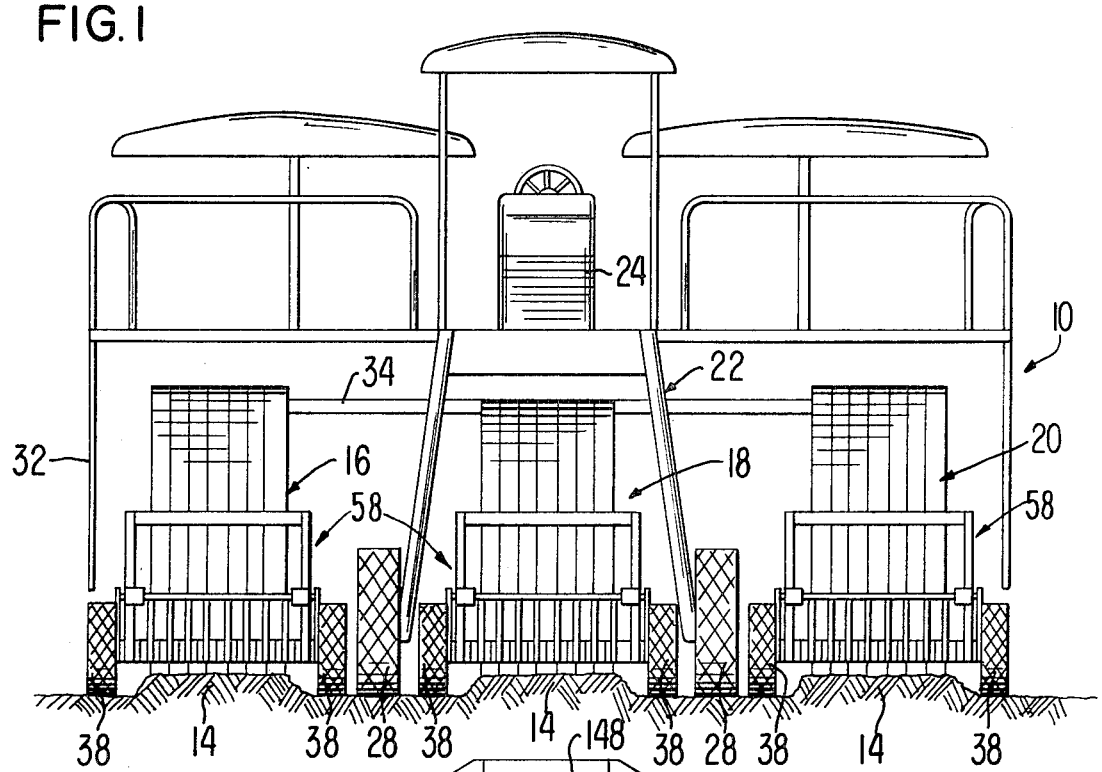
FIG. 1 is a front elevational view of an asparagus-harvesting machine embodying the teachings of the present invention.
Figure 2:
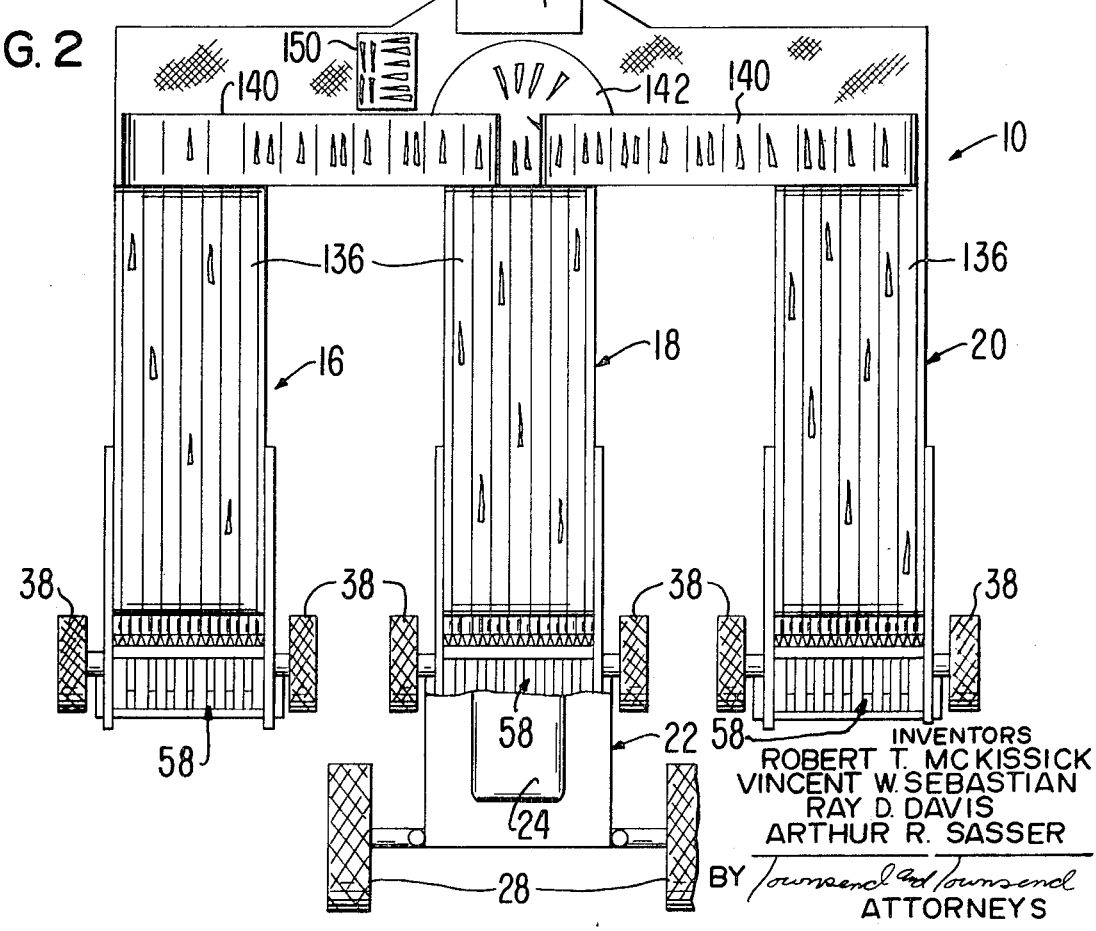
FIG. 2 is a fragmentary, top plan view of the machine.

The asparagus-harvesting machine which forms the subject matter of the present invention is broadly denoted by the numeral 10 and is illustrated in FIGS. 1-3. Machine 10 is adapted to harvest growing spears 12 of asparagus as the latter extend upwardly from the ground and after the spears have attained a predetermined height as sensed by electrical sensing switches forming integral parts of the machine as hereinafter described. The asparagus spears 12 project upwardly from moundlike rows 14 (FIG. 1) and the machine moves over a number of adjacent rows 14 to harvest or cut the spears that have attained the aforesaid predetermined height. To this end, machine 10 has three sections 16, 18 and 20 which are adapted to move over respective rows 14 as machine 10 moves forwardly over the ground.

As will hereinafter be more fully set forth, each of sections 16, 19 and 20 is provided with a sensing and cutting unit which senses the height of the growing spears of asparagus in the corresponding row 14 and which cuts those spears which have grown to the predetermined height mentioned above. Moreover, these spears are cut below ground and are then lifted out of the ground and directed rearwardly of the forward direction of travel of the machine and placed on an inclined conveyor for movement to the rear of the machine for collection and placement in a suitable receptacle, whereby the cut spears can be taken from the machine and readied for market.

Machine 10 has a central, tractorlike power unit 22 provided with a motor 24 dispersed forwardly of an operator location 26. Unit 22 is supported by front ground engaging wheels 28 and rear ground engaging wheels 30, there being a suitable power connection (not shown) from motor 24 to either the front wheels or the rear wheels for moving machine 10 forwardly. The operator at location 26 can steer machine 10 and control motor 24 as well as view the field in advance of machine 10. Access to location 26 is gained by an access ladder 32 carried by power unit 22.

Sections 16, 18 and 20 are coupled to power unit 22 for forward movement therewith. To this end, power unit 22 has a rear frame member 34 which is disposed transversely to the forward path of travel of the machine. Each of the sections 16, 18 and 20 is pivotally mounted at its rear end on member 34 for movement about a generally horizontal axis. Each section extends forwardly and downwardly from the pivot axis 36 thereof about which the section can rotate with respect to member 34. Thus, power unit 22, in effect, pushes sections 16, 18 and 20 forwardly. The sections are so arranged that they straddle respective rows 14 in the manner shown in FIG. 1 as the machine moves in a forward direction. The forward end of each section has a pair of ground engaging wheels 38 which normally engage the ground on opposite sides of the respective row 14 when the section is in its operative position as shown in FIGS. 1 and 3. Means (not shown) can be provided on power unit 22 for selectively raising and lowering each of the sections 16, 18 and 20 so that the sections can be elevated out of their operative positions shown in FIGS. 1 and 3 when it is desired to move the machine from one field to another or for moving the machine to and from a storage or parking area. In such a case, the sections are rotated about the axis 36 so that wheels 38 are spaced above the ground.

Each of the sections 16, 18 and 20 are substantially identical in construction with respect to each other; hence, the description of one of the sections will suffice for that of the other sections. For purposes of illustration, therefore, section 16 will be described hereinafter.

Section 16 includes a pair of spaced side members 40 which extend forwardly from pivot 36 thereof (FIG. 3) and terminate adjacent to and rearwardly of wheels 38. A pair of forward beams 42 are secured to and extend forwardly from side members 40 and make an acute angle therewith as shown in FIG. 3. Members 42 are coupled together at their front ends by a crossbeam 44 (FIG. 4) and each member 42 has a pair of angularly disposed struts 46 and 48, strut 46 being pivotally connected by a pin 50 to the corresponding beam 42 and strut 48 being pivotally connected by a pin 52 to the corresponding beam 42. Strut 48 is adjustable in length and is coupled at its lower end to the lower end of strut 46. Also, struts 46 and 48 terminate at the axis 54 of the corresponding front wheels 38. Strut 48 can be increased or decreased in length by rotating a tool-engaging projection 56 on its upper end so as to rotate a screw or other adjustable means within a tubular housing of strut 48 and thereby adjust the position of shaft 54 with respect to beam 42. The effect of changing the length of strut 48 is to vary the height of the sensing and cutting unit 58 carried on beams 42 adjacent to and slightly rearwardly of the forward ends thereof.

Sensing and cutting unit 58 is comprised of a plurality of generally parallel, channel-defining plates 60, only one of which is shown in FIG. 4. Each plate 60 has a forward portion 62 and a rearward portion 64, the forward portion 62 of the various plates 60 of unit 58 being interconnected by a cross piece 66 (FIG. 4) which is transverse to beams 42. The rear portion 64 of each plate 60 has a concave edge 68 which is adjacent to the rearwardly disposed periphery of a coulter wheel 70 mounted for rotation on a stub shaft 72 spanning the distance between a pair of fore-and-aft, generally rigid straps 74 secured at their rear ends to plate 60 and connected together at their forward ends. A brace 76 extends downwardly from the forward portion 62 of plate 60 and connects with the forward ends of straps 74.

One of beams 42 is provided with an upright, rigid element 78 provided with a longitudinal slot 80 therein. Element 78 is slidably received within a channel member 82 rigidly secured to an outermost plate 60. A bolt 84 extends through the slot and is coupled to the outer plate 60. A screw 86 bears against the upper end of element 78 and is carried by channel member 82. Thus, as the head 88 of screw 86 is rotated, channel member 82 and thereby sensing and cutting unit 58 can be moved upwardly or downwardly with respect to beams 42 to thereby vary the height of unit 58 with respect to the row 14 over which it is adapted to pass when machine 10 moves in a forward direction over the ground. Thus, there are two ways in which cutter unit 58 can be adjusted with respect to row 14. One of the ways is to adjust the position of wheel 38 relative to beam 42 by adjusting the length of strut 48. The second way is by adjusting screw 86 to vary the location of unit 58 with respect to beams 52. As shown in FIG. 4, one of wheels 38 of section 16 is in engagement with the ground on one side of the corresponding row 14. Also, coulter wheel 70 extends partially into the ground and the purpose of the coulter wheel is to cut the trash or debris laying on the row so that the trash will not be picked up by the machine but will be cut into small pieces. Rearmost portion 64 of each plate 60 has a pair of projections 90, only one of which is shown in FIG. 4. Projections 90 are in proximity to the outer periphery of the corresponding wheel 70 to keep trash from entering the region between the concave front edge of rearmost portion 64 and rearmost extremity or periphery of wheel 70.

The space between each pair of adjacent coulter wheels of unit 58 defines a channel 92 (FIGS. 5 and 6) for receiving the spears 12 aligned therewith. The side boundaries of each channel 92 are defined by the rigid straps 74 of adjacent wheels 70, such straps being bowed outwardly as shown in FIG. 6 so as to direct the spears slightly toward the center of the channel and away from the corresponding coulter wheels. Thus, the coulter wheels will have less tendency to slash into spears which are in direct alignment therewith.

Each channel 92 is provided with a pair of electrical sensing switches 94 secured in any suitable manner to the corresponding plates 60 rearwardly of corresponding coulter wheels 70 as shown in FIGS. 4, 5 and 6. The construction of each switch 94 is shown in FIGS. 7–11, each switch having a laterally extending actuating arm 96 which extends into the corresponding channel 92 and is normally disposed transversely to the forward path of travel of machine 10. As shown in FIGS. 5 and 6, the actuating arms 96 of adjacent switches 94 are in substantial alignment with each other with the switch 94 of one channel 92 being in proximity to the corresponding switch of the next adjacent channel 92. For purposes of illustration, both of the last-mentioned switches are tied together and are coupled in any suitable manner to suitable support structure 98 coupled in a manner not shown to the adjacent plate 60. Structures 98 can be made so that they permit adjustment of the heights of switches 94 with respect to the rows 14 over which unit 58 passes. The purpose of this is to allow the switches to sense spears 12 of different heights since actuating arms 96 are across the path of relative movement of the spears with respect to the machine and are engaged by the spears if the heights of the latter are above a predetermined minimum value.

When the actuating arm 96 of a switch 94 is engaged by a spear 12, the arm is swung rearwardly by the spear as the latter tends to move rearwardly of the corresponding channel 92. When this occurs, the switch is actuated to, in turn, cause actuation of a power device 100 carried on a support 102 coupled in any suitable manner to beams 42. A power device 100 is provided for each channel 92, respectively. The power device operates a pair of cutter blades 104 and 106 normally disposed on the opposite sides of the respective channel 92, the blades being operated in such a manner that they crisscross in the manner shown in FIG. 6 when the corresponding power device 100 is actuated. The purpose of this crisscross action is to sever a spear 12 at a location below ground level in the corresponding row 14. The blades are in engagement with each other when they move into and out of the crisscross arrangement shown in FIG. 6; thus, the blades are self-sharpening by virtue of their interengagement. Thus, there are a pair of blades 104 and 106 for each channel 92, respectively, and blades move together when either one or both of the corresponding switches 94 are actuated. Electrical circuitry (not shown) couples switches 94 of each channel 92 with the corresponding power device 100.

For purposes of illustration, each power device 100 includes a fluid piston and cylinder assembly which is coupled with a pressurized fluid source (not shown) for operation when a corresponding switch 94 is actuated. Each power device 100 is provided with a shiftable piston 108 which reciprocates with respect to the cylinder 110 of power device 100.

Blade 104 of each channel 92 is carried at the lower end of a rod 112 mounted for rotation on the rearmost edge of the corresponding plate 60 by a number of vertically spaced bearings 114, 116 and 118. Blade 106 of each channel 92 is mounted at the lower end of a rod 120 which is mounted for rotation in bearings 122, 124 and 126 on the rearmost edge of the corresponding plate 60. As shown in FIGS. 4 and 6, rod 112 of one channel 92 is mounted slightly forwardly of rod 120 of an adjacent channel 92. Thus, rod 112 behind each pate 60 can rotate independently of the adjacent rod 120 since these two rods operate blades for different channels 92. Each blade 104 is in proximity to and slightly above the corresponding blade 106 when the latter are in their initial positions as shown in FIGS. 4 and 6. The blades are substantially parallel to the path of travel of machine 10 until they are caused to move into their operative positions for cutting a spear. FIG. 6 shows the cutting positions of the blades in dashed lines.

The spears cut by blades 104 and 106 of machine 10 are picked up by a plurality of rollers 122 rearwardly of switches 94, there being a pair of rollers 122 for each channel 92, respectively. Each roller 122 has a conical forward portion 124 and a cylindrical rear portion 126 coaxial with conical portion 124. Each roller is rotated by a rod 128 extending forwardly and upwardly from the roller and coupled to a drive assembly 130 (FIG. 4) mounted on the front ends of beams 42. Rod 128 is concentric with portions 124 and 126 of the corresponding roller 122 so that rotation of the rod will cause rotation of the roller. The pair of rollers for each channel 92 rotate in opposite directions relative to each other. They also rotate in directions to cause elevation of a cut spear. As shown in FIG. 5, the counter rotation of a pair of adjacent rollers 122 is denoted by the arrows 132.

A transverse bar 134 is carried in a fixed position below rollers 122 as shown in FIGS. 4, 5 and 6. The purpose of the bar is to engage the spears and to tilt the same as the spears are between adjacent rollers 122. This tilting action is to orient the spears in an inclined position so that the spears will be directed upwardly and rearwardly onto an inclined conveyor 136 which has its lower end immediately rearwardly of rollers 122 as shown in FIG. 4. Conveyor 136 has a number of longitudinally extending ribs 138 which partition the same into channels and keep the spears in adjacent channels separated from each other. The ribs also tend to keep the spears pointed upwardly if the spears have a tendency to roll to the side after being placed on the conveyor. The spears are projected onto the conveyor by rollers 122 with the tops of the spears being above the bottoms thereof.

Rollers 122 are made from a soft, cushion material which will assure gripping of the spears to elevate the same without damage to the spears themselves. To this end, a suitable foam material is to be preferred, such material being sufficiently porous to prevent any substantial retention of water or dirt.

The conveyor system of machine 10 includes the three conveyors 136 of sections 16, 18 and 20. A pair of transverse conveyors 140 are disposed at the rear ends of conveyors 136 of sections 16 and 20 for directing the spears toward the center of the machine and onto a rotatable turntable 142 disposed below conveyors 140 as shown in FIGS. 2 and 3. The inner ends of conveyors 140 are spaced apart as shown in FIG. 2 so that spears carried by these conveyors can move off the same and gravitate onto turntable 142. The inner ends of conveyors 140 are also aligned with certain channels of conveyor 136 of section 18 so that spears can move off the last-mentioned conveyor onto conveyors 140, and then onto turntable 142. The central channel of conveyor 136 of section 18 is directly aligned with the turntable so that spears in these channels gravitate directly onto the turntable.

The turntable is mounted on a shaft 144 supported in any suitable manner for rotation on a rear platform 146 of machine 10. Power means (not shown) is provided to operate conveyors 136 and 140 and to rotate turntable 142. An operator seated on a bench 148 on platform 146 can remove the spears from turntable 142 as the latter rotates and then place the spears into a container 150. The container can then be removed from the machine and taken to a location at which the spears carried therein are readied for market.

Each switch 94 is comprised of a pair of mating parts 152 and 154 (FIGS. 7, 10 and 11) of any suitable material, such as plastic or the like. Part 152 has an inner surface to which a magnet 156 is attached, such as by an adhesive or the like. Part 152 also has a groove on its inner surface for rotatably receiving a shaft 158 which projects beyond the sides of part 152 as shown in FIGS. 7 and 8. A pair of flanges 160 are mounted on shaft 158 and retain the latter against any substantial longitudinal movement relative to part 152.

An L-shaped metallic member 162 is secured to shaft 158 and is movable therewith. Member 162 is formed from a material having a relatively high magnetic permeability, such as low carbon steel. A portion of member 162 is parallel to shaft 158 and magnet 156 and, in one position of the shaft, this portion of member 162 is on the side of magnet 156 opposite to the side corresponding to shaft 158.

Part 154 is provided with a recess 164 which is aligned with shaft 158, magnet 156 and member 162 so as to receive the latter in the manner shown in FIG. 10 when parts 152 and 154 mate with each other to form the housing of switch 94. Screws 166 are used to interconnect parts 152 and 154.

A Reed switch 168 is carried by part 154 in any suitable manner adjacent to recess 164. The switch is electrically coupled to a pair of terminals 169 for making contact with the electrical circuit for actuating the corresponding power device 100. For purposes of illustration, switch 168 is embedded in part 154 at a location near the junction between parts 152 and 154. Switch 168 is sensitive to the magnetic field of magnet 156 so that the switch is actuated when subjected to such magnetic field.

In a first operative position of shaft 158, member 162 will be disposed between magnet 156 and switch 168 so that the switch will not be subjected to the magnetic field of the magnet. This corresponds to the position at which the arm 96 of the switch is disposed transversely of the path of forward travel of the machine, arm 96 being coupled at one end of shaft 160. In the position of member 162 as shown in FIG. 10, the member effectively shields switch 168 from the magnetic field so that switch 168 remains deactuated. However, when a spear engages arm 96, the arm will cause shaft 160 to rotate in the direction of arrow 170 (FIG. 11) to move member 162 out of the space between the magnet and switch 168. When this occurs, switch 168 will be subjected to the magnetic field of the magnet and will thereby be actuated to, in turn, cause actuation of the corresponding power device 100. After the spear has moved out of engagement with the corresponding arm 96, the magnetic attraction between magnet 156 and member 162 will return the member to its initial position shown in FIG. 10. Thus, arm 96 will return to its starting position disposed transversely of the path of travel of the machine.

OPERATION

It will be assumed that the machine is ready to be moved over a field containing a number of rows 14 of growing asparagus. The height of the sensing and cutting units 58 will have been adjusted to provide for the cutting of spears which have grown to predetermined heights above the rows. Also, switches 94 will be located so that they will cut the spears at the predetermined heights.

With rollers 122 rotating and with conveyors 136 and 140 operating to convey cut spears to turntable 142, the machine is set into motion in a forward direction with sensing and cutting units 58 aligned with corresponding rows 14 as shown in FIG. 1. As the machine moves forwardly, the spears are directed into channels 92 and those spears which have grown to the predetermined height will engage the corresponding switch arms 96 and swing the arms rearwardly at which time the corresponding power devices 100 are actuated to cause the pivoting movement of the corresponding blades 104 and 106. The blades, moving below the upper surface of the rows, will then quickly and cleanly severe the spears. The oncoming, contrarotating rollers 122 are then moved into engagement with the tops of the spears and will cause elevation of the same from the ground. The lower portions of the spears will engage bar 134 as the rollers tend to move the spears upwardly and rearwardly, whereupon the spears are tilted slightly as they engage bar 134. Finally, the spears are projected upwardly and rearwardly as they leave the rollers and the spears then fall into the channels of the corresponding conveyor 136.

The spears are conveyed upwardly and rearwardly and then onto cross conveyors 140 for movement inwardly to a central location above turntable 142. The spears are then caused to gravitate onto one side of the turntable and rotation of the latter will move the spears into a position at which an operator seated on bench 148 can gather the spears and deposit them in container 150. The spears gravitate onto the turntable with the tops of the spears pointing toward the center of the turntable. Thus, the spears will at all times be properly oriented so that the operator can easily gather them into bunches without having to sort them.

We claim:

1. A crop-harvesting machine comprising: a cutting and sensing unit having a number of crop-receiving channels disposed in side-by-side relationship; means coupled with the unit for moving the same forwardly over the ground and along a path permitting a growing crop to be received within at least one of the channels, there being means extending into at least certain of the channels from their front ends and disposed adjacent to the sides thereof for guiding a crop thereinto, said unit including a crop sensor and a pair of spaced, elongated blades for each channel, respectively, the sensor being disposed to sense the height of a growing crop received within a corresponding channel, said each pair of blades being disposed on respective opposite sides of the corresponding channel and normally extending longitudinally of the path of travel of the unit and below the level of the ground in which the crop is growing, said blades being mounted on said unit for movement transversely of said path of travel to sever the crop sensed by the sensor; means coupled with the blades of each channel, respectively, for rotating the blades in response to the sensing of a crop by the sensor; means adjacent to and above the blades for elevating the crop to a predetermined height above the ground after the crop has been cut; means adjacent to said elevating means for tilting the crop as it is being elevated; and a conveyor extending upwardly and rearwardly from said elevating means, said elevating means and said tilting means being operable to direct the crop onto the conveyor, the conveyor being operable to move the crop received thereby upwardly and rearwardly of said unit after the crop has been elevated to said predetermined height.

2. A machine as set forth in claim 1, wherein said sensor comprises a switch having a shiftable arm normally extending transversely of said path and being movable rearwardly thereof when the same is engaged by a growing crop, said conveyor comprising an endless member having a number of longitudinally disposed ribs thereon.

3. A machine as set forth in claim 2, wherein said switch includes a rotatable shaft, said arm being secured to said shaft, a switch portion responsive to a magnetic field, a magnet, and a shield carried by said shaft for movement from a first position between said switch portion and said magnet to a second position spaced from said first position when said arm moves rearwardly, said shield being operable to prevent response to the switch portion to the magnetic field of the magnet when said shield is in said first position.

4. A machine as set forth in claim 1, wherein said elevating means comprises a pair of contrarotating rollers for each channel, respectively, said rollers being rotatable about generally parallel axes longitudinally inclined relative to said path.

5. A machine as set forth in claim 1, wherein the blade corresponding to one side of one of the channels is in overlying relationship to the blade corresponding to the opposite side of the next adjacent channel.

6. A machine for harvesting asparagus comprising: a cutting and sensing unit having a plurality of channels in side-by-side relationship, each channel having an open front end and provided with guide means extending thereinto from the front end thereof for directing spears of asparagus into the channel as the unit moves forwardly over the ground; means coupled with the unit for moving the same forwardly over the ground, said unit including means in each channel, respectively, for sensing the heights of the spears received in the channel, a pair of spaced, elongated cutting blades for each channel, respectively, each pair of blades being on respective opposite sides of the corresponding channel and normally disposed below ground level in substantial parallelism to the path of movement of the unit, said pair of blades being mounted on the unit for rotation into operative positions extending transversely of said path and in cutting relationship to a spear disposed in the corresponding channel and sensed by said sensing means, and means for each pair of blades, respective, for rotating the latter into their operative positions in response to the sensing of a spear by the sensing means; a pair of rollers for each channel, respectively, each pair of rollers being inclined with respect to said unit and disposed above the blades for grasping a cut spear therebetween and for elevating the same above the ground as the unit moves forwardly, said rollers being operable to release a spear grasped thereby after the spear has been elevated to a predetermined height above the ground; means below each pair of rollers for causing a spear to become inclined as it is being elevated by the rollers; and an elongated, inclined conveyor extending upwardly and rearwardly from said rollers and disposed to receive a spear released therefrom.

7. A machine as set forth in claim 6, wherein is provided a plurality of coulter wheels rotatably mounted on said unit forwardly of said blades, there being a coulter wheel on each side of each channel, said guide means being adjacent to and extending substantially diametrically along each coulter wheel, respectively.

8. A machine as set forth in claim 6, wherein each of the rollers has a forwardmost conical portion and a rearmost cylindrical portion.

9. A machine as set forth in claim 8, wherein said causing means includes a bar disposed transversely of said path below said rollers, the bar being positioned to engage the lower portion of a spear when the latter is being elevated by a pair of rollers to thereby cause the spear to become inclined with respect to said path.

10. An asparagus harvesting machine comprising: a sensing and cutting unit having a plurality of spaced, generally parallel plates presenting a number of crop-receiving channels with each channel having an open front end to receive growing spears of asparagus; power means coupled with said unit for moving the same forwardly over the ground; a pair of spaced, elongated blades for each channel, respectively; a coulter wheel rotatably mounted on the unit forwardly of each blade, respectively, each coulter wheel being disposed to extend partially into and roll through the ground as the unit moves forwardly; guide means on opposite sides of each coulter wheel for guiding said growing spears into the corresponding channel; means in each channel, respectively, for sensing the height of a spear received within the channel; means mounting each pair of blades adjacent to the rear of and on respective opposite sides of the corresponding channel, said pair of blades being disposed normally below the ground in substantial parallelism to the forward path of travel of the unit, said pair of blades being rotatable through the ground into spear-cutting positions extending toward each other and disposed transversely of said path to thereby cause adjacent spears of asparagus to be severed thereby; means connected to said blade-mounting means and responsive to the sensing means for moving the blades into said spear-cutting positions thereof; a pair of rollers for each channel, respectively; means mounting each pair of rollers in proximity to each other for rotation about generally parallel, longitudinally inclined axes with the rollers being disposed adjacent to and above the corresponding blades; means coupled with said roller mounting means for rotating the rollers of each channel in opposite directions to cause the rollers to grasp a cut spear and to elevate the same; means below said rollers for engaging a spear as the same is being elevated and for causing the spear to become inclined; and an elongated conveyor extending upwardly and rearwardly from the rollers and disposed to receive the spears elevated by the rollers.

* * * * *